United States Patent
Li et al.

(10) Patent No.: US 11,239,974 B2
(45) Date of Patent: Feb. 1, 2022

(54) DATA TRANSMISSION METHOD AND APPARATUS, STORAGE MEDIUM AND PROCESSOR

(71) Applicant: XI'AN ZHONGXING NEW SOFTWARE CO., LTD., Shaanxi (CN)

(72) Inventors: Xincai Li, Shenzhen (CN); Yajun Zhao, Shenzhen (CN); Hanqing Xu, Shenzhen (CN); Ling Yang, Shenzhen (CN); Juan Liu, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 28 days.

(21) Appl. No.: 16/610,987

(22) PCT Filed: May 2, 2018

(86) PCT No.: PCT/CN2018/085305
§ 371 (c)(1),
(2) Date: Nov. 5, 2019

(87) PCT Pub. No.: WO2018/202032
PCT Pub. Date: Nov. 8, 2018

(65) Prior Publication Data
US 2020/0177341 A1    Jun. 4, 2020

(30) Foreign Application Priority Data

May 5, 2017   (CN) .......................... 201710313815.9

(51) Int. Cl.
*H04L 5/00*    (2006.01)
*H04L 1/16*    (2006.01)
(Continued)

(52) U.S. Cl.
CPC .......... *H04L 5/0053* (2013.01); *H04L 1/1607* (2013.01); *H04L 5/0048* (2013.01);
(Continued)

(58) Field of Classification Search
CPC ... H04L 5/0053; H04L 1/1607; H04L 5/0048; H04L 27/2655; H04W 72/0413; H04W 72/042; H04W 72/0446; H04W 72/1205
See application file for complete search history.

(56) References Cited

U.S. PATENT DOCUMENTS

2017/0064686 A1*   3/2017   Li .................... H04W 72/0406
2018/0041857 A1*   2/2018   Ouchi ................. H04W 74/08
(Continued)

FOREIGN PATENT DOCUMENTS

| CN | 104703205 A | 6/2015 |
| CN | 105917601 A | 8/2016 |
| WO | 2014110783 A1 | 7/2014 |

OTHER PUBLICATIONS

European Search Report for corresponding application EP 18 79 4377; dated Nov. 27, 2020.
(Continued)

*Primary Examiner* — Shukri Taha
(74) *Attorney, Agent, or Firm* — Cantor Colburn LLP

(57) ABSTRACT

Provided are a data transmission method and apparatus. The method includes that a first node configures configuration information of each time unit within a transmission period, where the configuration information includes a transmission direction and transmission content in each time unit, that the first node notifies the configuration information to a second node, and that the first node performs data transceiving with the second node according to the configuration information.

17 Claims, 6 Drawing Sheets

(51) Int. Cl.
*H04L 27/26* (2006.01)
*H04W 72/04* (2009.01)
*H04W 72/12* (2009.01)

(52) U.S. Cl.
CPC ....... *H04L 27/2655* (2013.01); *H04W 72/042* (2013.01); *H04W 72/0413* (2013.01); *H04W 72/0446* (2013.01); *H04W 72/1205* (2013.01)

(56) References Cited

U.S. PATENT DOCUMENTS

| | | | | |
|---|---|---|---|---|
| 2018/0332612 | A1* | 11/2018 | Takeda | H04W 72/14 |
| 2019/0069312 | A1* | 2/2019 | Oh | H04W 72/12 |
| 2020/0068556 | A1* | 2/2020 | Tiirola | H04L 5/0053 |
| 2020/0137730 | A1* | 4/2020 | Zhang | H04L 5/0007 |

OTHER PUBLICATIONS

Huawei et al, "On Dynamic and Semi-Static Operation", 3GPP, vol. RAN WG1, No. Spokane USA, Apr. 2, 2017, XP051242396.
Nokia Networks et al, "Collision handling for NB-IOT" 3GPP Draft, vol. RAN WG1, No. Sophia Antipolos, Mar. 16, 2016, XP051080991.
Qualcomm Incorporated: "Contents of Group Common PDCCH", 3GPP Draft: R1-1705604, vol. RAN WG1, No. Spokane, WA 20170403-20170407; Apr. 2, 2017, XP051243728.
Zte et al., "DL Common Control for NR", 3GPP Draft. vol. Ran WG1, No. Spokane USA, April 2, 2017, XP051242518.
International Search Report for corresponding application PCT/CN2018/085305 filed May 2, 2018; dated Jun. 27, 2018.
Huawei et al., "On UL Mutiplexing of URLLC and eMBB Transmissions", 3GPP TSG RAN WG1 Meeting #88, Athens, Greece Feb. 13-17, 2017, R1-1701666.

* cited by examiner

DATA TRANSMISSION METHOD AND APPARATUS, STORAGE MEDIUM AND PROCESSOR

CROSS-REFERENCES TO RELATED APPLICATIONS

This application is based on and claims priority to Chinese patent application No. 201710313815.9 filed on May 5, 2017, the disclosure of which is incorporated herein by reference in its entirety.

TECHNICAL FIELD

The present disclosure relates to the field of communications and, particularly, to a data transmission method and apparatus, a computer storage medium and a processor.

BACKGROUND

In 5G new radio (NR) communication, it is an inevitable trend to support traffic adaptation to achieve forward compatibility. The traffic adaptation refers to allowing semi-persistent configuration and/or dynamic configuration in uplink and downlink transmission directions to satisfy a traffic load requirement or match the change of the traffic load. How to support or implement flexible duplexing or dynamic time division duplexing (TDD) is a problem to be solved first for achieving the traffic adaptation. At the same time, the problem of cross-link interference caused by the dynamic change also needs to be considered. This problem has not accomplished in the third generation partnership project (3GPP) standard discussion yet. In the RAN 1 88bis conference in April, no complete conclusion is drew on how to determine the transmission direction and the transmission content at a certain moment.

The problem related to processes of scheduling and hybrid automatic repeat request (HARQ) caused by the dynamic change of the uplink and downlink should also be considered. For example, a base station sends downlink control information (DCI) in slot 1 to schedule slot 3 and slot 4 for uplink data transmission. However, downlink data with a high priority, e.g., a downlink data packet of ultra reliable and low latency communication (URLLC) traffic needs to be imminently sent in slot 2, or strong interference is measured, then what the base station should do, how to notify a UE, and how to process the HARQ corresponding to the scheduled data need to be considered to satisfy the traffic requirement.

In the long term evolution (LTE) in the related art, TDD configuration is notified through a system information block (SIB), and uplink and downlink configuration has only 7 predefined configurations. After configuring a certain transmission direction, the base station will not change the transmission direction at least for a period. Although enhanced interference management for traffic adaptation (eIMTA) is introduced in the LTE R12 stage later and the frequency of sub-frame structure change is increased, the uplink and downlink transmission direction is still one of the original fixed 7 configurations. The problem of HARQ caused by the sub-frame structure change is solved through eIMTA in a manner of defining a reference configuration.

No effective solution has yet been proposed for the above-mentioned problems in the related art.

SUMMARY

The embodiments of the present disclosure provide a data transmission method and apparatus, a computer storage medium and a processor, to at least solve the problem of cross-link interference in the related art.

According to an embodiment of the present disclosure, a data transmission method is provided. The method includes: configuring configuration information of each time unit within a transmission period, where the configuration information includes: a transmission direction and transmission content in each time unit; notifying the configuration information to a second node; and performing, by the first node, data transceiving with the second node according to the configuration information.

Optionally, configuring the configuration information of each time unit within the transmission period includes: determining the transmission period; configuring a transmission resource for uplink transmission within the transmission period, and configuring a transmission resource for downlink transmission within the transmission period; and configuring the transmission direction within the transmission period, where the transmission direction includes at least one of: an uplink transmission direction or a downlink transmission direction.

Optionally, determining the transmission period includes one of: configuring the transmission period through operation administration and maintenance (OAM), configuring the transmission period through radio resource control (RRC) signaling, configuring the transmission period through a physical broadcast channel (PBCH), notifying the transmission period through a system information block (SIB), or acquiring the transmission period in a random access process.

Optionally, configuring the transmission resource for the uplink transmission within the transmission period includes: configuring, through a SIB or high-layer signaling, a time unit for the uplink transmission within the transmission period, a periodic sounding reference signal (SRS) for transmission, a physical uplink control channel (PUCCH) and a physical random access channel (PRACH).

Optionally, configuring the transmission resource for the downlink transmission within the transmission period includes: configuring a time unit fixedly used for the downlink transmission within the transmission period, and a time unit used for transmitting a synchronization signal (SS) block and transmitting a periodic channel state information-reference signal (CSI-RS).

Optionally, configuring the transmission direction within the transmission period and notifying the configuration to the second node includes one of the following steps: semi-persistently configuring the transmission direction of each time unit, or a potential slot structure of each time unit, and when a time unit has a requirement of adjusting a transmission direction or a slot structure, indicating an adjusted transmission direction through dynamic downlink control information; configuring a structure of a remaining flexible-resource part of each slot within the transmission period, and notifying the structure through DCI, where the structure indicates at least a transmission direction of a remaining resource part of each slot within the transmission period; notifying the transmission direction within the transmission period through a group common physical downlink control channel (PDCCH) or a common PDCCH, and notifying a changed direction to a scheduled UE through a UE-specific notification; determining structures of a current time unit and next time units in a license assisted access (LAA) manner, where the structures are able to indicate at least transmission directions of respective time units; determining the first symbol or first two symbols of each time unit to be downlink, and the last symbol or last two symbols of each time unit to be uplink in a semi-persistent configuration or predefinition manner, and performing notification; or semi-persistently configuring a candidate time-unit structure, and notifying an index of the structure through a group common PDCCH or media access control (MAC) control element (CE).

Optionally, the group common PDCCH sends the semi-persistently configured candidate time-unit structure to a group of second nodes, and second nodes in a same group of second nodes capable of receiving a time-unit structure sent from the same group common physical downlink control channel form the group of second nodes in at least one of the following manners: being classified, according to geographical positions; being classified, according to beams; being classified, according to sizes of traffic volumes; being classified, according to resources; or being classified, according to coverage areas, into the group of second nodes.

Optionally, group identity (ID) information of the group common PDCCH is acquired in an initial access process or configured through RRC signaling.

Optionally, the group common PDCCH carries at least one of the following information: information about a slot structure, scheduling request resource information, group hybrid automatic repeat request-acknowledgement (HARQ-ACK) feedback information, reserved bit field information, indication information for indicating a resource discarded for ultra reliable and low latency communication (URLLC) communication traffic, indication information for indicating a slot structure to an edge UE, a resource of an aperiodic channel state information-reference signal, or indication information for indicating a candidate position of a PDCCH in a mini-slot.

Optionally, the configuration information includes a slot structure with slot aggregation and flexible duplexing combined.

Optionally, the slot structure is determined through a semi-persistently configured length or class of the slot aggregation.

Optionally, the slot structure includes one of the following: each slot has uplink control information, downlink control information and a group common PDCCH, and a structure of each slot is the same; only the first aggregated slot has control information; or each slot has uplink control information, downlink control information and the group common PDCCH, and the structure of each slot is different.

Optionally, in the slot structure, when each slot has uplink control information, downlink control information and the group common PDCCH and that the structure of each slot is the same, structures of a plurality of slots are semi-persistently configured, and aggregation classes of the plurality of slots are determined through the group common PDCCH.

Optionally, in the slot structure, when only the first aggregated slot has control information, an aggregation class and a position of the group common PDCCH are configured in a manner of semi-persistent RRC signaling configuration.

Optionally, in the slot structure, when each slot has uplink control information, downlink control information and the group common PDCCH and the structure of each slot is different, patterns semi-persistently configured through high-layer signaling are notified, and the structure of each slot is indicated in a bitmap manner through the group common PDCCH.

Optionally, aggregated slots are used for transmitting one transmission block (TB), or used for retransmitting one code block group (CBG); or a part of the aggregated slots is used for URLLC traffic, and another part is used for a retransmitted CBG.

Optionally, performing, by the first node, the data transceiving with the second node according to the configuration information includes that: in the case where semi-persistent configuration scheduling and group hybrid automatic repeat request-acknowledgement feedback are fed back within timing time, if the transmission direction of a slot is changed, data transmitted in an original direction is processed in one of the following manners: being discarded; if a next slot has a spare resource, being transmitted in the spare resource of the next slot; if the slot and a next slot with the transmission direction schedule the second node at a same frequency position, performing multi-user multiplexing by the second node at frequency position in the next slot with the same transmission direction to transmit the data; re-indicating a new data transmission position; pre-configuring two time domain positions in initial scheduling, and sending the data in the first available time domain position; or the UE scheduling the current slot performs sensing for a preset time on a frequency domain resource scheduled by the first orthogonal frequency division multiplexing symbol in the next slot with the same transmission direction, and transmitting the data if the sensing is successful, while abandoning transmission or performing transmission in a modulation and coding scheme or with power lower than a preset threshold if the sensing fails.

Optionally, performing data transceiving between the first node and the second node according to the configuration information includes that: for NR dynamic TDD, when the attribute of a slot where original acknowledgement/non-acknowledgement (ACK/NACK) feedback is located changes so that the original ACK/NACK cannot be transmitted, the original ACK/NACK is processed in one of the following manners: no feeding back or being discarded; sending the original ACK/NACK with ACK/NACK of a next slot in a manner of channel selection or multiplexing; configuring and feeding back all subsequent feedback according to reference configuration; successively delaying; or giving a new slot position or symbol position for the ACK/NACK feedback in DCI.

According to an embodiment of the present disclosure, another data transmission method is provided. The method includes: receiving configuration information configured by a first node, where the configuration information includes: a transmission direction and transmission content; and performing, by a UE, data transceiving according to the configuration information.

Optionally, the configuration information is generated through semi-persistent configuration and dynamic configuration.

Optionally, performing, by the UE, the data transceiving according to the configuration information includes that: when semi-persistently configured information and dynamically configured information conflict, the UE determines the transmission direction and the transmission content according to the latest received dynamic DCI signaling or configured priority of information to be transmitted.

Optionally, the step in which the UE determines the transmission direction and the transmission content according to the latest received dynamic DCI signaling or configured priority of the information to be transmitted includes one of the steps described below.

A scheduled UE transmits data according to a latest scheduling signaling or slot format, punches at a transmission position of a reference signal in a different direction according to semi-persistently configured signaling to discard data in uplink transmission or downlink transmission at the punched position.

Dynamic adjustment of a transmission position of an aperiodic reference signal is indicated. For the scheduled UE, indication is performed through UE-specific DCI. For non-scheduled UEs, indication is performed through group common PDCCHs. For data transmission of a semi-persistence scheduling (SPS) and grant-free UE, DCI is adopted again to schedule a new resource, or an ending of current transmission is indicated. For a ZP-CSI-RS, transmission data is reserved.

When unicast DCI indication of the UE is not received or transmission direction information is not indicated in unicast DCI, the transmission direction and the transmission content are determined according to the group common PDCCH.

Priority of a semi-persistently configured ensured fixed resource is higher than priority of a resource notified through DCI.

The transmission direction and the transmission content are determined according to pre-configured information or specific DCI.

According to another embodiment of the present disclosure, a data transmission apparatus is provided. The apparatus is applied to a first node and includes: a configuration module, a notification module and a communication module. The configuration module is configured to configure configuration information of each time unit within a transmission period, where the configuration information includes: a transmission direction and transmission content in each time unit. The notification module is configured to notify the configuration information to a second node. The communication module is configured to perform data transceiving with the second node according to the configuration information.

Optionally, the configuration module includes: a determination unit, a first configuration unit and a second configuration unit. The determination unit is configured to determine the transmission period. The first configuration unit is configured to configure a transmission resource for uplink transmission within the transmission period and configure a transmission resource for downlink transmission within the transmission period. The second configuration unit is configured to configure the transmission direction within the transmission period, where the transmission direction includes at least one of: an uplink transmission direction or a downlink transmission direction.

According to another embodiment of the present disclosure, a data transmission apparatus is provided. The apparatus is applied to a user equipment (UE) and includes: a reception module and a communication module. The reception module is configured to receive configuration information configured by a first node, where the configuration information includes: a transmission direction and transmission content. The communication module is configured such that the UE performs data transceiving according to the configuration information.

Optionally, the configuration information is generated through semi-persistent configuration and dynamic configuration.

Optionally, the communication module includes: a communication unit, which is configured such that when semi-persistent configuration information and dynamic configuration information conflict, the UE determines the transmission direction and the transmission content according to a slot format or information priority indicated through latest received dynamic DCI signaling.

According to another embodiment of the present disclosure, a storage medium is further provided. The storage medium is configured to store program codes for executing the steps described below.

Configuration information of each time unit within a transmission period is configured. The configuration information includes: a transmission direction and transmission content in each time unit.

The configuration information is notified to a second node.

Data transceiving is performed with the second node according to the configuration information.

According to the embodiments in the present disclosure, a first node configures configuration information of each time unit within a transmission period, where the configuration information includes: a transmission direction and transmission content in each time unit; the configuration information is notified to a second node; and the first node performs data transceiving with the second node according to the configuration information. The transmission direction and the transmission content are configured for each time unit, so the problem of cross-link interference is effectively avoided through a combination of a semi-persistent configuration manner and a dynamic (signaling) notification manner.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
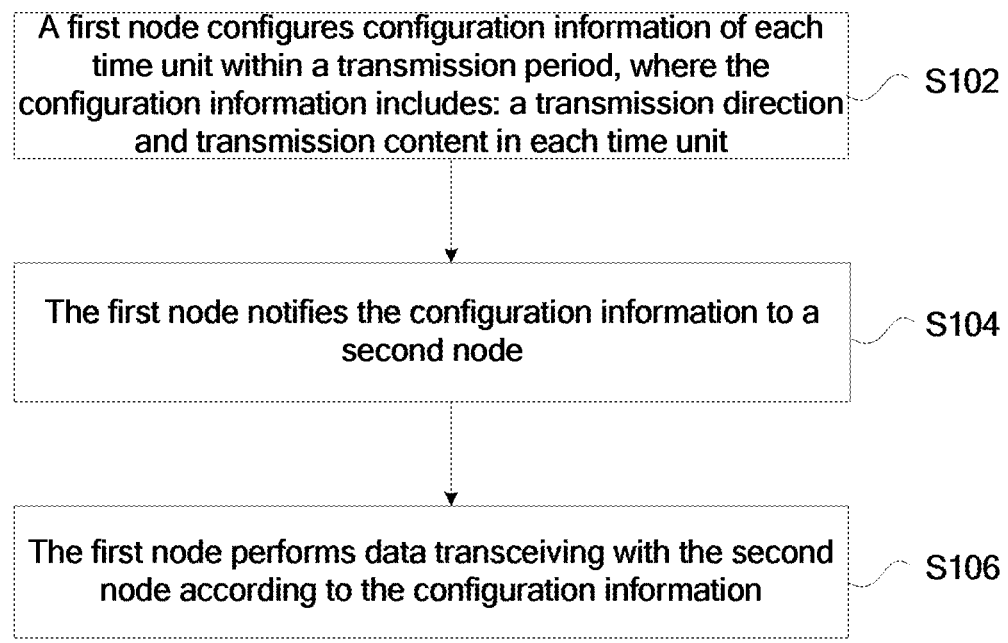
FIG. 1 is a flowchart of a data transmission method according to an embodiment of the present disclosure.

This embodiment provides a data transmission method. FIG. 1 is a flowchart of the data transmission method according to an embodiment of the present disclosure. As shown in FIG. 1, the method includes steps described below.

In S102, a first node configures configuration information of each time unit within a transmission period. The configuration information includes: a transmission direction and transmission content in each time unit.

In S104, the first node notifies the configuration information to a second node.

In S104, the first node performs data transceiving with the second node according to the configuration information.

Through the steps above-mentioned, the first node configures the configuration information of each time unit within the transmission period, where the configuration information includes: the transmission direction and transmission content in each time unit; the first node notifies the configuration information to the second node; and the first node performs the data transceiving with the second node according to the configuration information. The configuration information is configured only for the time units within one transmission period (a certain period). This manner of configuring configuration information for time units within only one transmission period may be referred to as a semi-persistent configuration manner. That is, in this embodiment, the transmission direction and transmission content are configured in the semi-persistent configuration manner for each time unit. In addition, in this embodiment, once the first node configures the configuration information for time units within one transmission period, the first node notifies the configuration information to the second node. This notification manner may be regarded as a dynamic notification manner. Therefore, in this embodiment, the problem of cross-link interference can be effectively avoided through a combination of the semi-persistent configuration manner and the dynamic (signaling) notification manner.

Optionally, the first node performing the above steps may be a network element on the network side, such as a base station, an evolved base station or a small base station. The first node may also be another network element capable of being served a base station, for example, a central node. The second node is an equipment on the terminal side, such as a user equipment (UE), a mobile phone and the like, but is not limited thereto.

Figure 2:
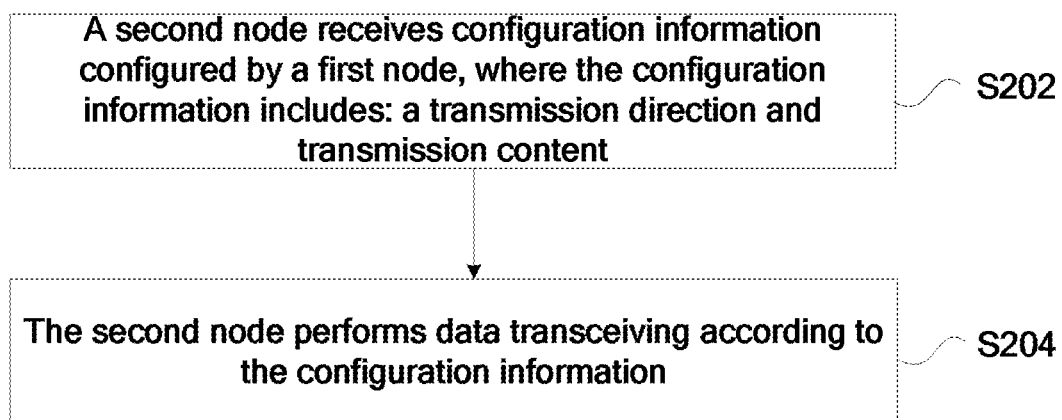
FIG. 2 is a flowchart of another data transmission method according to an embodiment of the present disclosure.

An embodiment provides another data transmission method. FIG. 2 is a flowchart of another data transmission method according to the embodiment of the present disclosure. As shown in FIG. 2, the method includes steps described below.

In S202, a second node receives configuration information configured by a first node. The configuration information includes: a transmission direction and transmission content.

In S204, the second node performs data transceiving according to the configuration information.

The time unit may be one of: a sub-frame, a slot, a mini-slot, an orthogonal frequency division multiplexing symbol or an aggregated slot (a slot in 5G).

Optionally, the base station configures the configuration information of each time unit within a period through steps described below.

In S11, a transmission period is determined.

In S12, a transmission resource for uplink transmission within the transmission period is configured, and a transmission resource for downlink transmission within the transmission period is configured.

In S13, a transmission direction within the transmission period is configured. The transmission direction includes at least one of: an uplink transmission direction or a downlink transmission direction.

In this embodiment, the transmission period is determined in one of the following manners: configuring the transmission period through operation administration and maintenance; configuring the transmission period through a radio resource control signaling; configuring the transmission period through a physical broadcast channel; notifying the transmission period through a system information block; configuring the transmission period by a media access control unit; or acquiring the transmission period in a random access process.

In this embodiment, the transmission resource for the uplink transmission within the transmission period is configured by: configuring, through the system information block or high-layer signaling, a time unit used for the uplink transmission within the transmission period, and configuring a periodic sounding reference signal for transmission, a physical uplink control channel and a physical random access channel.

Optionally, the transmission resource for the downlink transmission within the transmission period is configured by: configuring a time unit fixedly used for the downlink transmission within the transmission period, and configuring a synchronization signal block for transmission, and a periodic channel state information-reference signal for transmission.

In an optional implementation mode according to this embodiment, the transmission direction within the transmission period is configured through one of steps described below.

The transmission direction of each time unit or a potential slot structure of each time unit is semi-persistently configured. When a time unit has a requirement of adjusting the transmission direction or the slot structure, the transmission direction to be adjusted of the time unit is indicated through dynamic downlink control information.

The structure of a remaining flexible-resource part of each slot within the transmission period is configured and notified through DCI. The structure indicates at least the transmission direction of the remaining resource part of each slot within the transmission period.

The transmission direction within the transmission period is notified through a group common physical downlink control channel or a common. When the transmission direction of a time unit changes, the time unit whose transmission direction changes is notified to a scheduled second node through UE-specific downlink control information.

The structures of a current time unit and one or more time units next to the current time unit are notified in a license assisted access manner.

Through semi-persistent configuration or predefinition, the first symbol or first two symbols of each time unit are determined to be used for the downlink transmission, and the last symbol or last two symbols of each time unit are determined to be used for the uplink transmission.

A candidate time-unit structure is semi-persistently configured, and an index of the structure is notified through a group common physical downlink control channel or media access control unit.

In an optional implementation mode according to this embodiment, the group common physical downlink control channel is sent to a group of second nodes. Each group of second nodes is classified in one of the following manners: being classified according to geographical positions; being classified according to beams; being classified according to sizes of traffic volumes; being classified according to resources; or being classified according to coverage ranges.

Here, after configuring configuration information for a plurality of time units, the first node sends the configuration information to a plurality of second nodes through the group common physical downlink control channel. In this solution, the first node sends, through one group common physical downlink control channel, the configuration information to a plurality of second nodes that have the same or similar geographic position, the same or similar beam direction, the same or similar size of traffic volume, the same or similar time/frequency domain resource, and/or have the same coverage range. That is, various second nodes in the same group of second nodes need to satisfy at least one of these elements: having the same or similar geographic position, having the same or similar beam direction, having the same or similar size of traffic volume, having the same or similar time/frequency domain resource, or having the same coverage range.

Optionally, the group identity information of the group common physical downlink control channel is acquired in an initial access process, or configured through radio resource control signaling or a media access control unit.

In an optional implementation mode according to this embodiment, the group common downlink control channel carries at least one of the following information: information about a slot structure, scheduling request resource information, group hybrid automatic repeat request-acknowledgement feedback information, reserved bit field information, indication information for indicating the resource discarded for ultra reliable and low latency communication traffic, information about a potential transmission direction of each time unit, the resource of an aperiodic channel state information-reference signal, or indication information for indicating a candidate position of a physical downlink control channel in a mini-slot.

Optionally, the configuration information includes a slot structure with slot aggregation and flexible duplexing combined. The slot structure is determined by semi-persistently configuring a length or class of the slot aggregation.

Optionally, the slot structure includes one of the following structures: each slot has uplink control information, downlink control information and a group common physical downlink control channel, and the structure of each slot is the same; only the first aggregated slot has the downlink control information, only the last aggregated slot has the uplink control information and the remaining resources are used for data transmission; or each slot has the uplink control information, the downlink control information and the group common physical downlink control channel, and the structure of each slot is different.

Optionally, in the slot structure, when each slot has the uplink control information, the downlink control information and the group common physical downlink control channel and the structure of each slot is the same, the structures of a plurality of slots are semi-persistently configured, and aggregation classes of the plurality of slots are determined through the group common physical downlink control channel.

Optionally, in the slot structure, when only the first aggregated slot has the downlink control information, only the last aggregated slot has the uplink control information and the remaining resources are used for data transmission, an aggregation class and a position of the resource for the group common physical downlink control channel are configured in a manner of semi-persistent radio resource control signaling configuration.

Optionally, in the slot structure, when each slot has the uplink control information, the downlink control information and the group common physical downlink control channel, the first node semi-persistently configures a pattern of the slot structure through high-layer signaling, and the structure of each slot in aggregated slots is indicated in a bitmap indication manner through the group common physical downlink control channel, where the structure of each slot is different.

Optionally, configuration information about the slot aggregation is used for transmitting a transmission block or for retransmitting a code block group; or a part is used for ultra reliable and low latency communication traffic, and the other part except the part for ultra reliable and low latency communication traffic is used for retransmitting the code block group.

Optionally, the first node performs the data transceiving with the second node according to the configuration information through steps described below.

In the case where the timing between the scheduling and group hybrid automatic repeat request-acknowledgement feedback is semi-persistent configured, if the transmission direction of a slot is changed, data transmitted in an original direction is processed in one of the following manners: being discarded; if a next slot with same transmission direction has a spare resource, being transmitted on the spare resource of the next slot; if the slot and a next slot with the transmission direction schedule the second node at a same frequency position, performing multi-user multiplexing by the second node at frequency position in the next slot with the same transmission direction to transmit the data; re-indicating a new data transmission position; pre-configuring two time domain positions in initial scheduling, and sending the data in the first available time domain position; or the second node scheduling the current slot performs sensing for a preset time on a frequency domain resource scheduled by the first orthogonal frequency division multiplexing symbol in the next slot with the same transmission direction, and transmitting the data if the sensing is successful, while abandoning transmission or performing transmission in a modulation and coding scheme or with power lower than a preset threshold if the sensing fails.

Optionally, the first node performs the data transceiving with the second node according to the configuration information as follows: for dynamic time-division duplexing, when the uplink and downlink attribute of a slot where original acknowledgement/non-acknowledgement feedback is located changes so that the original acknowledgement/non-acknowledgement feedback cannot be transmitted, the original acknowledgement/non-acknowledgement is processed in one of the following manners: being discarded; being transmitted with acknowledgement/non-acknowledgement of a next slot in a manner of channel selection or multiplexing; configuring and feeding back all acknowledgement/non-acknowledgement feedback according to a reference uplink and downlink transmission direction; being successively delayed; or providing a new slot position or symbol position for the acknowledgement/non-acknowledgement feedback in downlink control information.

Correspondingly, on the side of the second node, the configuration information is generated through semi-persistent configuration and dynamic configuration.

Optionally, the second node performs the data transceiving according to the configuration information as follows: when semi-persistently configured information and dynamically configured information conflict, the second node determines the transmission direction and the transmission content according to the latest received dynamic downlink control information signaling or configured priority of information to be transmitted.

In an optional implementation mode according to this embodiment, the second node determines the transmission direction and the transmission content according to the latest received dynamic downlink control information signaling or the configured priority of the information to be transmitted in one of the following manners.

A scheduled second node transmits data according to a latest scheduling signaling or slot format, and punches, according to semi-persistently configured signaling, at the transmission position of an original reference signal different in direction to discard data in uplink or downlink transmission at the punched position.

Dynamic adjustment of the transmission position of an aperiodic reference signal is indicated. For a scheduled second node, the indication is performed through UE-specific downlink control information. For a non-scheduled second node, the indication is performed through a group common physical downlink control channel. For data transmission of a semi-persistent scheduled and grant-free second node, downlink control information is adopted again to schedule a new resource, or the ending of current transmission is indicated. For a zero power-channel state information-reference signal, transmission data is reserved.

When unicast downlink control information indication of the second node is not received or transmission direction information is not indicated in unicast downlink control information, the transmission direction and the transmission content are determined according to the group common physical downlink control channel.

The priority of a semi-persistently configured ensured fixed resource is higher than the priority of a resource notified through downlink control information.

The transmission direction and the transmission content are determined according to pre-configured information or specific downlink control information.

From the description of the implementation modes above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

A data transmission apparatus is further provided in this embodiment. The apparatus is used for implementing the above-mentioned embodiments and preferred implementation modes, and repetition will not be made about what has been described. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 3:
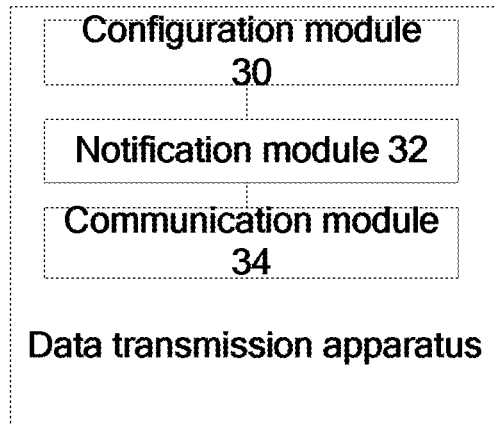
FIG. 3 is a structure block diagram of a data transmission apparatus according to an embodiment of the present disclosure.

FIG. 3 is a structural block diagram of a data transmission apparatus according to an embodiment of the present disclosure. The apparatus is applied to a base station. As shown in FIG. 3, the apparatus includes a configuration module 30, a notification module 32 and a communication module 34.

The configuration module 30 is configured to configure configuration information of each time unit within a period. The configuration information includes: a transmission direction and transmission content in each time unit.

The notification module 32 is configured to notify the configuration information to a second node.

The communication module 34 is configured to perform data transceiving with the second node according to the configuration information.

Optionally, the configuration module includes: a determination sub-module, a first configuration sub-module, and a second configuration sub-module. The determination sub-module is configured to determine the transmission period. The first configuration sub-module is configured to configure a transmission resource for uplink transmission within the transmission period and configure a transmission resource for downlink transmission within the transmission period. The second configuration sub-module is configured to configure the transmission direction within the transmission period, where the transmission direction includes at least one of: an uplink transmission direction or a downlink transmission direction.

The data transmission apparatus shown in FIG. 3 may be a network element at the network side, such as a base station, an evolved base station and a small base station; the apparatus may also be another network element capable of being served as a base station, for example, a central node.

Figure 4:
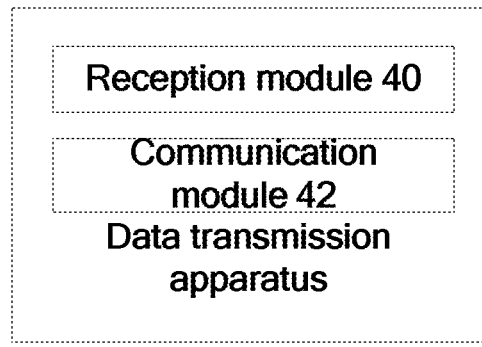
FIG. 4 is a structure block diagram of another data transmission apparatus according to an embodiment of the present disclosure.

FIG. 4 is a structural block diagram of another data transmission apparatus according to an embodiment of the present disclosure. The apparatus is applied to a UE. As shown in FIG. 4, the apparatus includes a reception module 40 and a communication module 42.

The reception module 40 is configured to receive configuration information configured by a first node. The configuration information includes: a transmission direction and transmission content.

The communication module 42 is configured such that a second node performs data transceiving according to the configuration information.

Optionally, the configuration information is generated through semi-persistent configuration and dynamic configuration.

The communication module 42 is configured to, when semi-persistently configured information and dynamically configured information conflict, determine the transmission direction and the transmission content according to a slot format or information priority indicated through the latest received dynamic downlink control information signaling.

The data transmission apparatus shown in FIG. 4 may be a network element at the terminal side, such as user equipment (UE), a mobile phone and the like.

It is to be noted that the various modules described above may be implemented by software or hardware. Implementation by hardware may, but may not necessarily, be performed in the following manners: the various modules described above are located in the same processor, or the various modules described above are located in their respective processors in any combination form.

Embodiment 3

This embodiment is an optional embodiment according to the present disclosure. A detailed description of the present application is given below in conjunction with specific implementation modes.

Some small detailed aspects about flexible duplexing or dynamic time-division duplexing (TDD) are considered in this embodiment. The whole includes aspects described below.

How to determine a data transmission direction and content of a certain transmission unit and notify the data transmission direction and content to a terminal are considered.

When transmission directions in two configurations are different, the terminal is designed in the manners described below.

Design is performed in combination of a group common physical downlink control channel (PDCCH) and a dynamic TDD requirement.

A slot structure with slot aggregation and flexible duplexing combined is designed and configured for a UE.

How to process HARQ timing configured semi-persistently, and dynamic TDD scheduling and HARQ are also considered.

Figure 5:
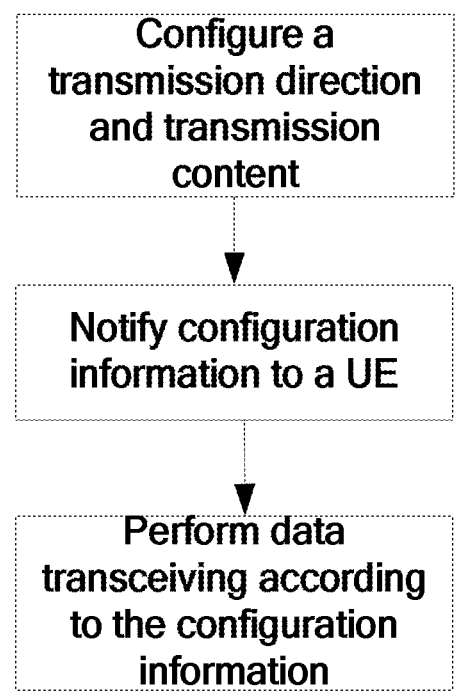
FIG. 5 is a flowchart on a base station side according to an embodiment of the present disclosure.

FIG. 5 is a flowchart for implementing a data transmission method applied to a base station according to an embodiment of the present disclosure. On the side of the base station, the data transmission flow is shown in FIG. 5. Firstly, the base station preconfigures the transmission direction and transmission content in each time unit within a period, then reconfigures or adjusts these resources and timely notifies the information to a terminal, and performs data transceiving according to the information.

In this embodiment, the slot structure (including the transmission direction and transmission content at a certain time) is determined and indicated through steps described below.

First, the transmission period is determined in one of the manners described below.

The transmission period is configured through operation administration and maintenance (OAM), or configured through radio resource control (RRC) signaling, or configured through a physical broadcast channel (PBCH), or notified through a system information block (SIB), or acquired in a random access process. The related configurating a transmission period is equivalent to preconfiguring a transmission period, such as configuring the transmission period in RRC signaling, configuring the transmission period in PBCH signaling; or for a preset transmission period, acquiring the preset transmission period in the random access process.

Then, through a SIB or high-layer signaling, certain time units within the transmission period are configured to be used for uplink transmission, and a periodic sounding reference signal (SRS) for transmission, a PUCCH (further, the physical uplink control channel (PUCCH) mainly bears a report related to periodic CSI/beam, and SR request) and a physical random access channel (PRACH) are configured.

Certain time units within the period are fixedly predefined as downlink slots used for downlink transmission of a synchronization signal (SS) block and a periodic channel state information-reference signal (CSI-RS). Specifically, in the case of a critical frequency of long term evolution (LTE), the transmission period is set to 5 ms, the first slot within the transmission period is configured to be used for downlink transmission, and the third slot is fixedly configured to be used for uplink transmission.

In the embodiment of the present application, the time unit includes a slot, a mini-slot and an orthogonal frequency division multiplexing (OFDM) symbol.

In the above-mentioned solution, transmission directions of partial time domain resources are fixedly configured. The partial time domain resources may be regarded as a part of time domain resources in the semi-persistent configuration whose transmission directions do not change within the transmission period. Expect this part of time domain resources, the configured time domain resources further include time domain resources whose transmission directions do not need to be fixedly configured. For the latter part of time domain resources (remaining resources), the transmission directions may be configured in at least one of manner 1 to manner 6.

Manner 1: One potential slot structure is semi-persistently configured, if there is an adjustment requirement, the requirement is indicated through dynamic radio resource control (DCI) (that is, DCI indicates that the slot structure needs to be adjusted); and if there is no subsequent dynamic DCI exists, data is transmitted according to the semi-persistently configured transmission direction or slot structure. Further, for a scheduled UE, the slot structure configured by a first node is notified to the scheduled UE through UE-specific DCI, and for a non-scheduled UE, the slot structure configured by the first node is notified to the non-scheduled UE through the group common PDCCH.

Manner 2: The structure of a remaining flexible-slot part in each slot is notified through DCI in each slot. The structure at least indicates the transmission direction of the remaining resource part in each slot within the transmission period.

Manner 3: The configuration within the configured period is notified through the group common PDCCH or a common PDCCH, and for the time unit whose transmission direction changes, the change of the transmission direction of the time unit may be notified, through a UE-specific PDCCH, to a scheduled UE using the time unit.

Combined with a scheduling manner, manner 3 includes steps described below.

For self-slot scheduling, a starting symbol position and offset of a scheduled PDSCH/PUSCH, or symbol positions occupied by the scheduled PDSCH/PUSCH are indicated through UE specific DCI.

For cross-slot scheduling, unified indication is performed through the group common DCI. The offset of the slot is firstly indicated, and then the length is indicated.

Manner 4: A manner similar to the licensed assisted access (LAA) is adopted. The structures of a current slot and subsequent one or more slots are notified through the group PDCCH. The structures indicate at least transmission directions of the slots.

Common DCI indicates the structure of the current slot and the structure of the next slot (a type of the current slot and a type of the next slot). The slot type only includes the uplink, the downlink, the downlink dominant and the uplink dominant.

Further, for the downlink dominant and the uplink dominant, a control region is subjected to blind detection first, and then the start and length of data are acquired through the UE-specific DCI, so that the structure of each hybrid slot is determined.

Manner 5:

In a manner of semi-persistent configuration or predefinition, the first symbol or the first two symbols of each slot are configured to be used for downlink transmission, and the last symbol or last two symbols of each slot are configured to be used for uplink transmission.

It can be understood that one slot includes multiple symbols. Among the multiple symbols included in one slot, symbols other than the semi-persistently configured or predefined symbols described above may all be regarded as remaining symbols. For a signal with an uplink or downlink direction per se in communication, for example, the PUSCH which is an uplink signal per se, and the PDSCH which is a downlink signal per se, their respective transmission directions do not need to be additionally indicated, but their respective occupied positions in the slot need to be indicated. The signal with the uplink or downlink direction per se may be regarded as a remaining symbol with an inherent attribute.

For the remaining symbol, the transmission direction of the remaining symbol is indicated according to the inherent attribute of the remaining symbol. For a scheduled UE, the offset of a scheduled PUSCH from the last symbol of a scheduled DCI is indicated through UE-specific uplink (UL) grant. That is, the starting position of the scheduled PUSCH is indicated through the UL grant to be the last symbol position of the scheduled DCI. It can be understood that the length of the PUSCH in this solution may be semi-persistently configured or dynamically indicated.

In addition, for a reference signal, the starting position of the reference signal is the starting symbol position of a data channel; and the offset of the reference signal, that is, the length of the reference signal, is semi-persistently configured or dynamically indicated according to an actual condition.

Among the remaining symbols, symbols other than the PUSCH, PDSCH and reference signal are set to gap (null) by default.

Manner 6: Several slot structures are predefined or semi-persistently configured according to deployment or application scenes, and then a base station notifies the slot structures to a terminal through the group common PDCCH, or notifies the slot structures to the terminal through a media access control (MAC) control element (CE).

According to this embodiment, in the scene where semi-persistently configured information and dynamically configured information conflict, the behavior of the UE includes behaviors described below.

The resolution rules at the time of conflict should be considered, and the general principle is as follows: determining the transmission direction and content according to a slot format or information priority indicated through the latest received dynamic DCI signaling. Specifically cases described below are included.

Case 1: Certain slots or mini-slots are semi-persistently configured to be used for uplink transmission, and the uplink transmission needs to be dynamically adjusted to be downlink transmission due to URLLC traffic. For such case where the transmission direction is changed, the transmission of periodic signals is affected, for example, the transmission of the periodic channel state information-reference signal (CSI-RS), sounding reference signal (SRS), synchronization signal block (SS block), semi-persistent scheduling (SPS) and grant-free resource are affected. Such effect can be eliminated through rules described below.

Rule: A scheduled UE transmits the PDSCH/PUSCH according to the latest scheduling signaling or slot format, and punches, according to the semi-persistently configured signaling, at a transmission position of the reference signal whose direction is different from the original direction. Then data transmitted at the punched position is discarded during uplink data transmission or downlink data transmission.

Alternatively, when the direction is indicated to be downlink, the periodic CSI-RS is transmitted by default, and the periodic SRS and periodic CSI/beam related feedbacks are not transmitted; and when the direction is indicated to be uplink, the periodic CSI-RS is not transmitted, and the periodic SRS and periodic CSI/beam feedbacks are transmitted.

Adjustment of the transmission position of an aperiodic reference signal (CSI-RS, SRS, dynamic PUCCH) is indicated dynamically.

For the scheduled UE, the indication is performed through UE-specific DIC. For non-scheduled UEs, the indication is performed through a common PDCCH to facilitate measurement.

For data transmission of an SPS scheduled and grant-free UE, DCI is adopted again to schedule a new resource, or the ending of current transmission is indicated.

For a zero power-channel state information-reference signal (ZP-CSI-RS), no punching needs to be performed.

Case 2: When slot format indication information in unicast DCI information and slot format indication information in the group common PDCCH conflict, the rules may be as shown in Table 1.

TABLE 1

| Group common PDCCH | Unicast PDCCH | Determined by UE |
|---|---|---|
| DL | DL | DL |
|  | UL | Error |
|  | No unicast PDCCH is received or no direction information is indicated in DCI | DL |

TABLE 1-continued

| Group common PDCCH | Unicast PDCCH | Determined by UE |
|---|---|---|
| UL | DL | Error |
|  | UL | UL |
|  | No unicast PDCCH is received or no direction information is indicated in DCI | UL |
| Other | DL | DL |
|  | UL | UL |
| No group common PDCCH is received or the group common PDCCH is not received according to RRC signaling configuration | DL | DL |
|  | UL | UL |

One of the cases shown in Table 1 will be described as an example. Information shown in Table 1 will be understood from the solution, and the other cases will be understood correspondingly.

For example, the slot format indication information in the group common PDCCH indicates that the transmission direction of a certain slot is the downlink (DL) transmission direction.

When the unicast DCI information indicates that the transmission direction of the slot is also the downlink transmission direction, which is the same as the preceding indication of the group common PDCCH, the UE determines that the transmission direction of the slot is the downlink transmission direction.

When the unicast DCI information indicates that the transmission direction of the slot is the uplink (UL) transmission direction, which is opposite to the preceding indication of the group common PDCCH, the UE does not define the transmission direction of the slot and considers this case as Error.

When no unicast PDCCH is received or no direction information is indicated in the DCI, the UE determines that the transmission direction of the slot is the downlink transmission direction according to the indication of the group common PDCCH.

Case 3: The transmission direction is determined according to the priority of transmission data.

The priority of a semi-persistently configured fixed resource is higher than the priority of a resource notified through DCI.

The transmission information is prioritized. For example, ACK/NACK, beam feedback and DCI related information have the highest priority, resources for SRS and CSI-RS related to a measurement reference signal have the second highest priority, and scheduled traffic data has the lowest priority.

If the terminal receives dynamic indication information indicating that the resource originally used for uplink ACK/NACK feedback is dynamically adjusted to transmit a downlink data channel, the DCI information is considered to be invalid.

Case 4:

For a semi-persistently configured resource for grant-free transmission, or for multi-slot PDSCH reception, or for multi-slot PUSCH/PUCCH transmission, when new DCI received is URLLC, processing is performed according to the solution described below.

The structure or the transmission direction indicated through the new DCI is adopted.

Case 5:

When the UE is configured to have not detected the group common PDCCH, the slot structure is determined according to preconfigured or specific DCI information.

According to this embodiment, in the scene related to the group common PDCCH, the process includes: determining a group (that is, determining the second nodes whose configuration information may be transmitted through a same group common PDCCH) in one of the following manners: being classified according to geographical positions; being classified according to beam directions; being classified according to sizes of traffic volumes, and performing multiple slot scheduling by the UE; being classified according to resources (frequency/time domain resources); or being classified according to coverage ranges. ID information of the group may be configured through RRC signaling in an initial access process.

The content of the group common PDCCH is therefore configurable, at least in relation to the attribute of the group.

The group common PDCCH may carry: information related to the slot structure, scheduling request resource information, group HARQ-ACK feedback information, reserved bit field information and information described blow.

The group common PDCCH indicates the resource discarded for URLLC.

The group common PDCCH indicates the slot structure to an edge UE, and then the edge UE notifies the slot structure to other base stations to perform interference coordination.

The group common PDCCH carries the resource for an aperiodic CSI-RS to facilitate the UE to perform measurements.

Figure 6:
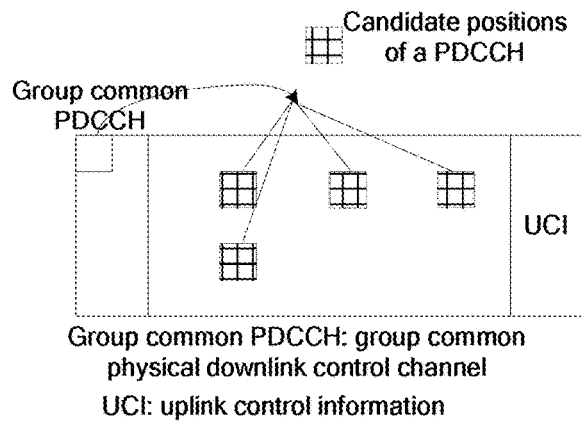
FIG. 6 is a schematic diagram of a group common PDCCH according to an embodiment of the present disclosure.

Candidate positions of a PDCCH in a mini-slot or activation or deactivation of a candidate position may further be indicated. FIG. 6 is a schematic diagram of the candidate positions of PDCCH indicated by the group common PDCCH according to the embodiment of the present disclosure. As shown in FIG. 6, UCI is uplink control information.

According to this embodiment, in the scene with slot aggregation and flexible duplexing combined, the process includes steps described below.

The length or class of the slot aggregation is semi-persistently configured. For example, four candidate lengths or classes of 2, 4, 8 and 16 are configured. The length or class of the slot aggregation is indicated through 2 bits in the group common PDCCH. Blind detection of the PDCCH may be reduced for the slot of a UE that do not need to be scheduled. The number of transmission slots of a UE that needs to be scheduled is given in the grant.

Figure 7:
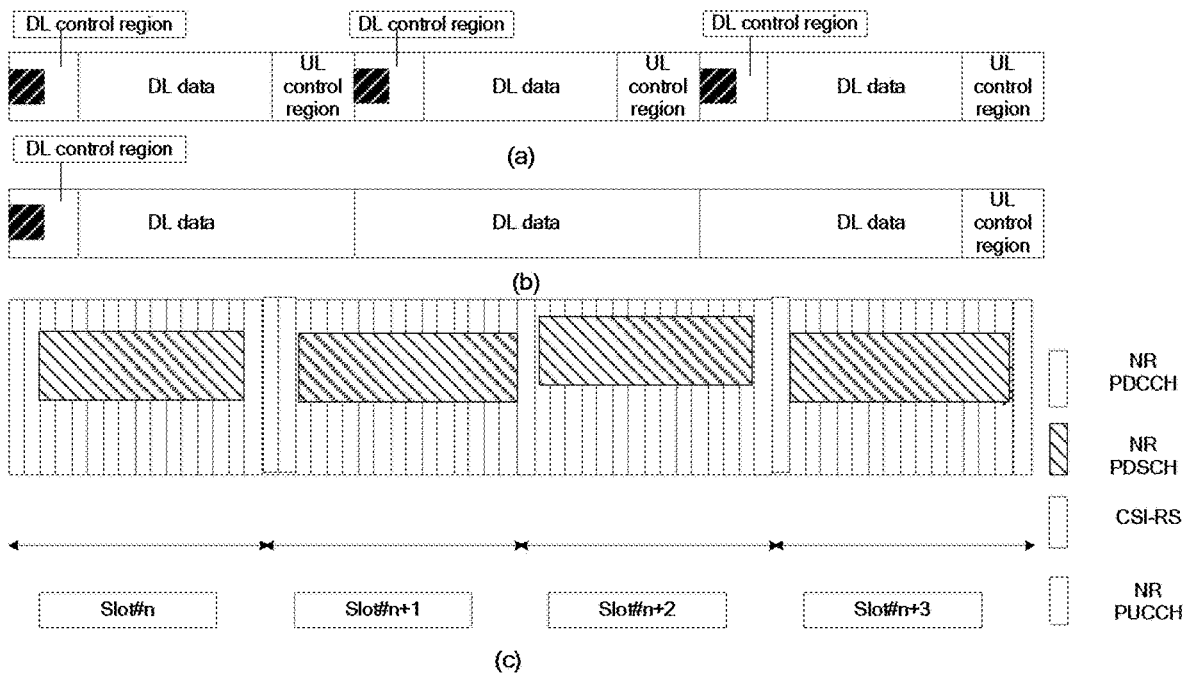
FIG. 7 is a schematic diagram of a slot structure with slot aggregation and dynamic TDD combined according to an embodiment of the present disclosure.

The following three types of slot structure are available in the case of the combination of the slot aggregation and the dynamic TDD. FIGS. 7(a), 7(b) and 7(c) are slot structure diagrams after the combination of the slot aggregation and the dynamic TDD according to the embodiment of the present disclosure. As shown in FIGS. 7(a), 7(b) and 7(c), the horizontal direction may indicate the time domain resource, and the vertical direction may indicate the frequency resource.

Case a: each slot has uplink control, downlink control and a group common (GC) PDCCH, and the structure of each slot is the same.

Case b: only one slot has control information.

Case c: each slot has uplink control, downlink control and a GC PDCCH, and the structure of each slot is different.

Correspondingly, the structures of the aggregated slots are indicated in manners described below.

In case a, the slot structure may be semi-persistently configured, and the aggregation class is provided through a GC PDCCH.

In case b, the position of the GC PDCCH may be configured while the aggregation class is configured in a semi-persistent RRC signaling configuration manner so that the signaling overhead is minimal.

In case c, the data starting symbol and ending symbol of each slot may be different. Some slot-structure patterns are semi-persistently configured through high-layer signaling. The structure of each slot is indicated in a bitmap manner through the GC PDCCH. In Slot #n to Slot #n+3 in FIG. 7(c), the frequency and time domain occupations of the NR (fifth generation mobile communication technology, 5G) PDCCH, NR PDSCH, CSI-RS, NR PUCCH and other signals are shown, respectively.

Figure 8:
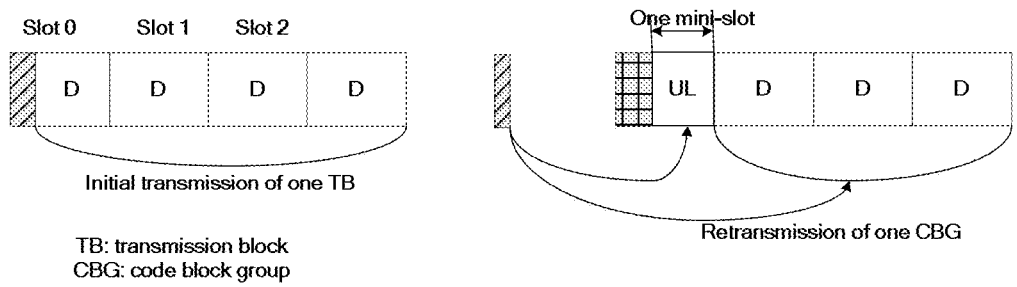
FIG. 8 is a schematic structure diagram of aggregated slots according to an embodiment of the present disclosure.

Further, the aggregated slots are used for transmitting one TB or used for retransmitting one code block group (CBG); or a part of the aggregated slots are used for transmitting URLLC traffic, and other slots are used for transmitting a retransmitted CBG FIG. 8 is a schematic structure diagram of aggregated slots according to an embodiment of the present disclosure. As shown in FIG. 8, one TB is transmitted in four aggregated slots in an initial scheduling. During the transmission, the scheduled terminal is notified through the group common PDCCH that the first slot among the four aggregated slots is modified into having an uplink dominant (UL) structure to transmit URLLC traffic. The subsequent three slots are used for retransmitting one CBG in the preceding TB.

According to this embodiment, in the scene of processing the effect of dynamic TDD on scheduling and HARQ timing, the process includes the following steps.

When the timing between scheduling information and data transmission and the timing between data transmission and the corresponding HARQ-ACK feedback are a value semi-persistently configured, how to determine this transmission feedback (HARQ-ACK feedback) position with respect to dynamic TDD will be explained in this embodiment.

Figure 9:
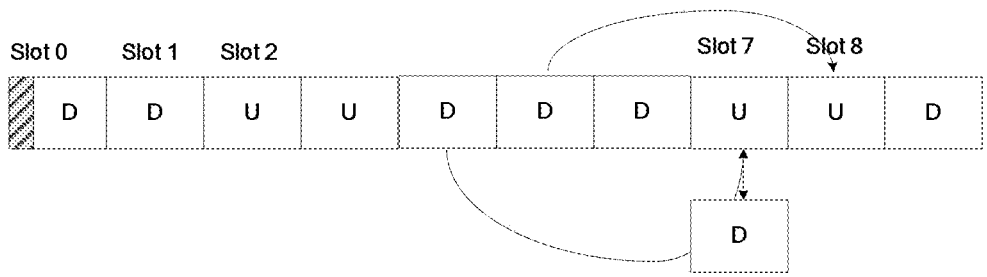
FIG. 9 is a schematic diagram of an effect of dynamic TDD on scheduling according to an embodiment of the present disclosure.

FIG. 9 is a schematic diagram of the effect of dynamic TDD on scheduling according to an embodiment of the present disclosure. The effect on scheduling transmission is shown in FIG. 9.

It can be understood that dynamic TDD in this embodiment refers to: when the transmission direction of a time unit is changed, a dynamic adjustment is performed in a TDD manner, and a series of transmission problems caused by the change are solved through the adjustment.

Assuming that the semi-persistently configured slot timing between the scheduling and the physical uplink shared channel (PUSCH) is n+3, no conflict exists if the PUSCHs scheduled in the slot 4 and slot 5 are transmitted in slot 7 and slot 8 respectively. However, slot 7 is temporarily adjusted to be used for downlink transmission due to dynamic TDD, and then the original uplink data in slot 7 may be processed according to solutions described below.

The original uplink data is discarded. Slot 8 is only used for transmitting the data scheduled through the latest DCI.

If slot 8 has a spare resource, the original uplink data may be transferred to slot 8 to be transmitted.

If the frequency position at which a UE is scheduled in slot 7 is the same as the frequency position at which a UE is scheduled in slot 8, the UE scheduled in slot 7 and the UE scheduled in slot 8 may be multi-user (MU) multiplexed at the same frequency position to transmit the original uplink data in slot 7.

A new data transmission position is re-indicated.

Two time domain positions are pre-configured in the initial scheduling. The original uplink data is sent in the first available time domain position.

The frequency resource scheduled by the first orthogonal frequency division multiplexing (OFDM) symbol in slot 8 is subjected to listen before talk (LBT) (sensing) for 25 microseconds. If the sensing is successful, the UE may perform data transmission. If the sensing is not successful, the UE abandons the transmission, or the UE performs transmission in a low modulation and coding scheme (MCS) or at low power.

The processing of the effect on acknowledge/non-acknowledge (ACK/NACK) will be described below.

For NR dynamic TDD, when the attribute of the original slot of ACK/NACK feedback is changed so that the transmission fails, the ACK/NACK may be processed according to at least one of the solutions described below.

The ACK/NACK is not fed back or is discarded, similar to discontinuous transmission (DTX).

The ACK/NACK is sent with the ACK/NACK of the next slot in a manner of channel selection or multiplexing.

Similar to eIMTA (dynamic TDD in LTE-A), all the subsequent feedbacks are fed back according to a reference configuration.

All the subsequent feedbacks are delayed successively.

A new slot position or symbol position for the ACK/NACK feedback is provided in DCI.

According to the embodiment of the present disclosure, the problem of cross-link interference can be effectively avoided through a combination of the semi-persistent configuration and the dynamic signaling. Particularly, for important control-type information, such as the PDCCH, uplink control information, ACK/NACK and other information, their positions and sending methods are indicated, so that dynamic uplink and downlink data transmission according to a traffic requirement is implemented.

According to the solution of configuring and notifying the configuration information within a transmission period in this embodiment, the corresponding processing solutions are provided for the effect on the subsequent scheduling and HARQ, so that the performance of the system is ensured.

Details of some processes are described below through specific application embodiments.

Application Instance 1

This instance describes a method for notifying a transmission direction.

1. A semi-persistently configured transmission period is an integer multiple of a certain number, such as {2, 4, 6, 8}, {4, 8, 12, 16} or {5, 10, 15, 20}. The transmission period may be configured through OAM, or configured through RRC signaling, or configured through a broadcast PBCH, or notified through a SIB; or a preset transmission period is acquired in a random access process.

2. For a semi-persistently fixed resource, a base station notifies a UE through the SIB of the information described below.

The last slot within the transmission period is fixed to be uplink for the uplink transmission of a periodic SRS, PUCCH (further, mainly including the report related to periodic CSI/beam, and SR request) and PRACH. The time domain position of the SRS and the time domain position of a short PUCCH in the structure of this slot are also semi-persistently configured and time division multiplexed (TDM).

The first slot within the transmission period is predefined as a downlink slot for the downlink transmission of broadcast information, an SS block and a periodic CSI-RS.

Other slots are dynamically configured to be used for uplink or downlink transmission.

Specifically, in the case of the critical frequency of LTE, an uplink and downlink subset may be aligned with the existing configuration of the LTE through adjustment. That is, the same transmission direction as the transmission direction of a LTE slot is adopted.

The transmission period may be fixed to 5 ms. The first slot within the transmission period is used for transmitting downlink data. The third slot is used for transmitting uplink data (information).

3. For other time domain resources (remaining resources) with non-fixed transmission directions, the transmission direction of a slot is indicated in manners described below.

Manner 1: A potential slot structure is semi-persistently configured, if a dynamic adjustment is needed, the adjustment is indicated through DCI, and if no subsequent dynamic DCI exists, the semi-persistent configuration is taken. Further, for a scheduled UE, the adjustment of the slot structure is notified to the scheduled UE through UE-specific DCI; and for a non-scheduled UE, the adjustment of the slot structure is notified to the non-scheduled UE through a group common PDCCH.

Manner 2: The structure of the remaining flexible-resource part in each slot is notified through the DCI of each slot, where the structure at least indicates the transmission direction of the remaining resource part in each slot within the transmission period.

Manner 3: The base station notifies the transmission direction and content of each slot within a transmission period through a group common PDCCH or a common PDCCH; and in the case where the UE is a scheduled UE, the scheduled UE is notified through a UE-specific DCI.

Combined with the scheduling scheme, manner 3 includes steps described below.

For self-slot scheduling, the starting symbol position and offset of the scheduled PDSCH/PUSCH, or the occupied symbol position are indicated through UE-specific DCI.

For cross-slot scheduling, unified indication is performed through the group common DCI. The offset of the slot and the length are indicated.

Case 2: The granularity of a resource fixedly used in the uplink and downlink is at a mini-slot level or symbol level, and at this time, the semi-persistently configured transmission period is the length (time unit) of one slot.

Then the TDD structure for each slot with the low latency is considered.

A downlink dominant slot structure is considered in the manner described below.

PDCCH and PDSCH share resources and the lengths occupied, by the PDCCH and PDSCH of each UE, in the slot are different, therefore, after the base station notifies the transmission content and direction of each slot within a transmission period through the group common PDCCH or the common PDCCH, the uplink or downlink transmission direction of each symbol (a flexible resource) in each slot needs to be notified through UE-specific DCI signaling. If no gap exists between the PDSCH and the PDCCH, the duration of a control resource set or the ending symbol position of a control resource set is indicated, or the starting symbol position of the PDSCH is indicated; and the duration of the control resource set may be specifically regarded as the length of the PDCCH.

A specific notification manner exists as described below.

In a manner similar to the license assisted access (LAA), the structure of at least one slot is notified trough common DCI. The structure of the at least one slot may be structures of a current slot and subsequent one or more slots (type of the current slot or type of the next slot). The type of the slot includes only the uplink, the downlink, the downlink dominant and the uplink dominant.

Further, for the downlink dominant and the uplink dominant, the control region is subjected to blind detection first, and then the data start and length are acquired through UE-specific DCI, so that the structure of each hybrid slot is determined.

Other manners as described below also exist.

Manner 1:

In a manner of semi-persistent configuration or predefinition, the first symbol or first two symbols of each slot are configured to be used for downlink transmission, and the last symbol or last two symbols of each slot are configured to be used for uplink transmission.

Then the attributes of remaining symbols are indicated. For a scheduled UE, the offset of a scheduled PUSCH relative to the last symbol of scheduled DCI is indicated through UE-specific UL grant.

The length of the PUSCH may be semi-persistently configured or dynamically indicated.

Meanwhile the position of a reference signal is also the offset relative to a starting symbol position of the data channel.

The remaining symbols are regarded as a gap by default.

For a non-scheduled UE, the information described below is notified through the group common PDCCH.

For a DL dominant slot, the duration of control resource set, or the end of control resource set, or the starting position of downlink data is notified.

For a DL dominant slot, the duration of UL is notified.

The duration of control resource set, such as the PDCCH, may be configured in any one of the two alternatives described below.

Alternative 1 (Alt 1): The duration of control resource set is semi-persistently configured through high-layer signaling.

Alternative 2 (Alt 2): The duration of control resource set is indicated through the group common PDCCH.

Manner 2: Several slot structures are predefined or semi-persistently configured according to deployment or application scenes, and then notified through the group common PDCCH.

Figure 10:
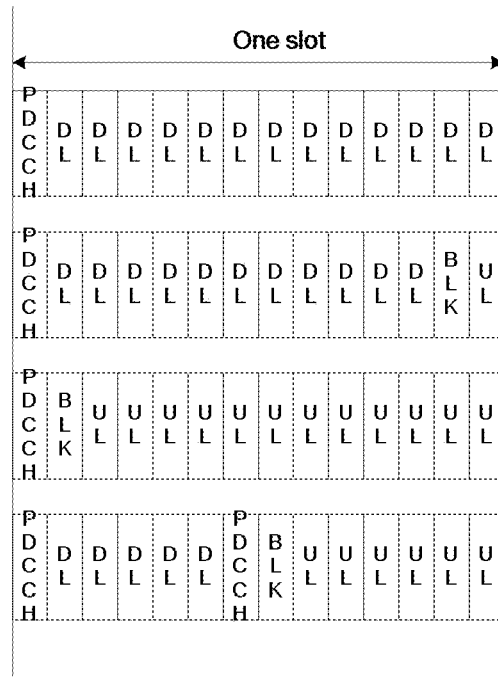
FIG. 10 is a schematic diagram of slot configuration structures according to an embodiment of the present disclosure.

Each symbol may be UL, DL, blank and sidelink. If each case is supported, the signaling overhead will be large, and thus the indication manner, i.e., this Manner 2, may be used to save signaling overhead. At least several slot configuration structures shown in FIG. 10 below are included. FIG. 10 is a schematic diagram of the slot configuration structures according to the embodiment of the present disclosure.

Downlink symbols configured in the middle are used for sending downlink control information to indicate the multiplexing of eMBB and URLLC.

Manner 3: the granularity of allocation changes from a sub-frame to a symbol in a LAA manner.

Manner 4: The resource of a physical downlink control channel is acquired through blind detection of UE, UE-specific DCI indicates the starting symbol position of a scheduled PDSCH/PUSCH, and the symbol position of a short PUCCH is semi-persistently configured.

Application Instance 2

This instance describes a data transmission method according to the embodiment of the present disclosure on a terminal side.

A terminal receives a transmission period, in the uplink and downlink transmission directions, determined by the base-station side. Specifically, on the base-station side, the transmission period in the transmission direction is configured through RRC signaling, or configured through a broadcast PBCH, or notified through a SIB, or acquired through a random access process or from MAC CE configuration. A base station notifies the transmission period to the terminal, and the terminal receives the transmission period.

In addition, information received by the terminal further includes the transmission direction and the transmission content in addition to the transmission period. The terminal determines the transmission directions and transmission content of certain one or more transmission units according to some information about the slot structure within the transmission period sent from the base station. That is, the terminal determines the transmission directions and transmission contents of the transmission units for uplink and downlink transmission according to the indication from the base-station side.

The information about the slot structure and transmitted content are determined to be received through at least one of: high-layer RRC signaling, a system message, common downlink control information, group common downlink control information and specific downlink control information. That is, the terminal receives configuration information through at least one of the above information.

Based on this information, a UE performs PRACH random access, reception of system information, sending and measurement of a reference signal, and channel estimation on a determined resource (in transmission unit specified by a terminal).

The terminal receives the configuration information such that the terminal starts blind detection, on the first OFDM symbol of a downlink slot or an uplink dominant slot or a downlink dominant slot, of common downlink control information, group common downlink control information and specific downlink control information. When the common downlink control information, group common downlink control information or specific downlink control information is detected, the configuration information is determined to be received.

Uplink traffic data is sent and downlink traffic data is received according to specific scheduling information and high-layer semi-persistently configured information. Specifically, the terminal transmits uplink and downlink traffic data according to the received configuration information.

Considering that when the uplink and downlink traffic data are transmitted, one scheduled transmission block TB may be transmitted in multiple slots, then when one of the multiple slots has a transmission error, only the content of the one slot is retransmitted during the next retransmission, and the content of other slots without a transmission error does not need to be retransmitted.

When the transmission direction of the scheduled slot is changed, the terminal processes data according to some rules. The particular rules are as shown in Table 1 according to embodiment 3 above.

Application Instance 3

This instance describes the case of multiple-slot aggregation scheduling.

Figure 11:
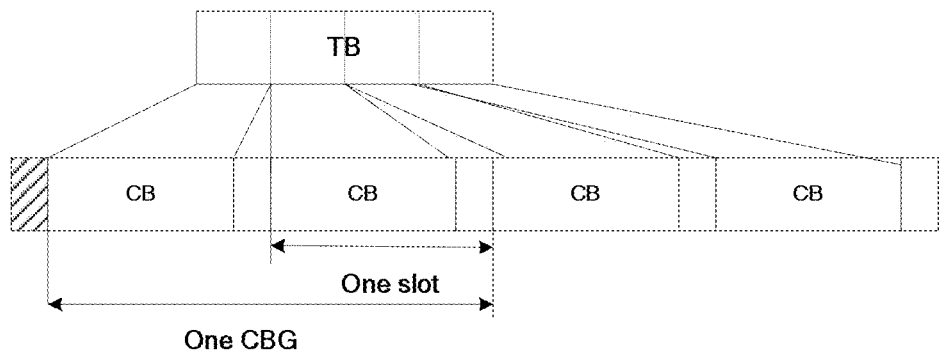
FIG. 11 is a schematic diagram illustrating that a base station sends scheduling information indicating that one transmission block (TB) is transmitted in four slots according to an embodiment of the present disclosure.

The base station sends scheduling information. A schematic diagram illustrating that when the scheduling information indicates that one transmission block (TB) is transmitted in four slots is as shown in FIG. 11. FIG. 11 is the schematic diagram illustrating that the base station sends the scheduling information indicating that the one TB is transmitted in the four slots according to an embodiment of the present disclosure, where the one TB is initially transmitted in the four slots that is, two CBGs. Processing of a particular feedback and retransmission combined with dynamic TDD is described below.

Figure 12:
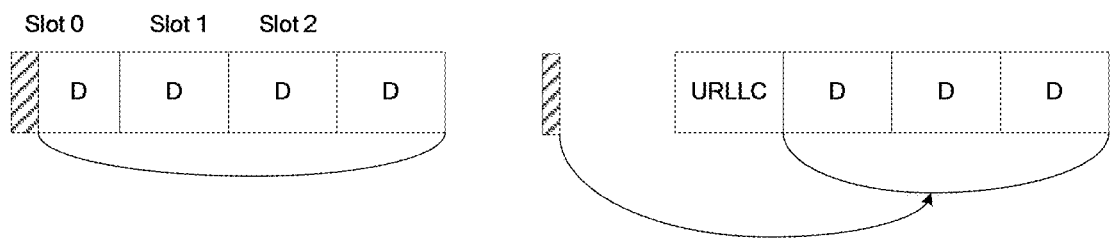
FIG. 12 is a schematic diagram illustrating that URLLC data is transmitted or a new TB is scheduled in a remaining slot according to an embodiment of the present disclosure.

Assuming that a bitmap feeds back four-bit ACK/NACK, and the ACK/NACK indicates 1000, where the 000 in the 1000 represents that the last three CBGs all have transmission errors, then the base station retransmits the three wrong CBGs together next time. Meanwhile, the base station indicates the slot position where the first CBG is retransmitted through DCI, and the sequence of the three wrong CBGs does not change, so that a retransmission combination error is avoided. If the number of aggregated slots is semi-persistently configured, three of the four retransmitted slots are used to retransmit the wrong CBGs, and the one remaining slot may be used for transmitting URLLC data or for scheduling a new TB, as shown in FIG. 12. FIG. 12 is a schematic diagram illustrating that URLLC data is transmitted or a new TB is scheduled in a remaining slot according to an embodiment of the present disclosure.

Figure 13:
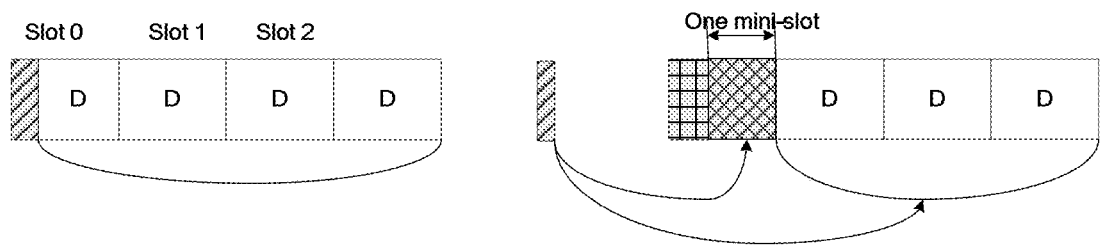
FIG. 13 is a schematic diagram of performing scheduling retransmission through a mini-slot when one CBG has a transmission error according to an embodiment of the present disclosure.

Alternatively, when one CBG has a transmission error, scheduling retransmission is performed through a mini-slot, as shown in FIG. 13. FIG. 13 is a schematic diagram of performing scheduling retransmission through a mini-slot when one CBG has a transmission error according to an embodiment of the present disclosure.

In this embodiment, multi-slot scheduling information is designed as described below.

Example 1

One DCI schedules all CBGs of one TB (all DCI is scheduled by one DCI), and downlink control information of the all CBGs is indicated.

The content of downlink control information is classified into three types.

First type: The content of DCI is common for all CBGs (this part of the DCI content is identical for the all CBGs). An MCS and a resource allocation indication bit field are included.

Second type: The content of DCI is independent for each CBG (this part of the DCI content is different for each CBG). A new data indicator (NDI)/ACK/NACK and a HARQ process index indication bit field are included.

Third type: The DCI content is used for only part of the slots (some information in the DCI is used only for part of the CBGs or slots). Some information bit fields described below are included.

Uplink demodulation-reference signal (DM-RS) transmission is included. A DMRS may be shared by multiple slots.

Channel sounding reference signal (SRS) transmission is included. The signal indicates the slot in which the transmission will be performed, and whether the transmission is performed once or multiple times.

Indication of a time domain position for transmission of a CSI-RS is included.

Or the position of a reference signal in the multi-slot scheduling may be given in a group common PDCCH (including positions in multiple scheduled slots and specific symbol positions).

Example 2

One DCI schedules one of multiple CBGs in one TB, and the one TB is scheduled through multiple pieces of DCI information.

This manner is somewhat convenient for implementing CBG-based retransmission, but DCI overhead is large.

To save the signaling overhead, some information, such as the number of scheduled slots and the pattern of frequency hopping, may be configured in a manner similar to SPS.

If due to dynamic TDD, a frequency/time domain resource may be re-indicated in a two-step indication manner.

Embodiment 4

An embodiment of the present disclosure further provides a storage medium. Optionally, in this embodiment, the storage medium above-mentioned may be configured to store program codes for performing steps described below.

In S1, configuration information of each time unit within a transmission period is configured.

The configuration information includes: a transmission direction and transmission content in each time unit.

In S2, the configuration information is notified to a terminal.

In S3, data transceiving is performed with the terminal according to the configuration information.

Optionally, in this embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in this embodiment, the processor executes, according to the program codes stored in the storage medium, the step in which the configuration information of each time unit within the transmission period is configured. The configuration information includes: the transmission direction and the transmission content in each time unit.

Optionally, in this embodiment, a processor executes, according to the program codes stored in the storage medium, the step in which the configuration information is notified to the terminal.

Optionally, in this embodiment, a processor executes, according to the program codes stored in the storage medium, the step in which the data transceiving is performed with the terminal according to the configuration information.

Optionally, for specific examples in this embodiment, reference may be made to the examples described in the above-mentioned embodiments and optional implementation modes, and repetition will not be made in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present invention should fall within the scope of the present disclosure.

It should be understood by those skilled in the art that the embodiments of the present disclosure may be provided as methods, systems, or computer program products. Therefore, the present disclosure may adopt a form of a hardware embodiment, a software embodiment, or a combination of hardware and software embodiments. In addition, the present disclosure may adopt a form of a computer program product implemented on one or more computer-usable storage media (including, but not limited to, a magnetic disk memory, an optical memory and the like) which include computer-usable program codes.

The present disclosure is described with reference to flowcharts and/or block diagrams of methods, devices (systems) and computer program products according to the embodiments of the present disclosure. It should be understood that computer program instructions may implement each flow and/or block in the flowcharts and/or block diagrams and a combination of flows and/or blocks in the flowcharts and/or block diagrams. These computer program instructions may be provided to a general-purpose computer, a special-purpose computer, an embedded processor or a processor of another programmable data processing device to produce a machine so that instructions executed by a computer or the processors of other programmable data processing devices produce the apparatus for implementing functions designated in one or more flows in the flowcharts and/or one or more blocks in the block diagrams.

These computer program instructions may also be stored in a computer-readable memory which can cause the computer or other programmable data processing devices to operate in a particular manner so that the instructions stored in the computer-readable memory produce a manufactured product including an instructing apparatus. The instructing apparatus implements the functions designated in the one or more flows in the flowcharts and/or the one or more blocks in the block diagrams.

These computer program instructions may also be loaded onto the computer or another programmable data processing device so that a series of operation steps are performed on the computer or another programmable device to produce processing implemented by the computer. Therefore, instructions executed on the computer or another programmable device provide steps for implementing the functions specified in one or more flows in the flowcharts and/or one or more blocks in the block diagrams.

The above are only preferred embodiments of the present disclosure and are not intended to limit the scope of the present disclosure.

INDUSTRIAL APPLICABILITY

In the embodiment, a first node configures configuration information of each time unit within a transmission period, where the configuration information includes: a transmission direction and transmission content in each time unit; the first node notifies the configuration information to a second node; and the first node performs data transceiving with the second node according to the configuration information. Since the transmission direction and transmission content in each time unit is configured, the problem of cross-link interference is effectively avoided through a combination of a semi-persistent configuration manner and a dynamic (signaling) notification manner.

What is claimed is:

1. A data transmission method, comprising:
configuring configuration information of each time unit within a transmission period, wherein the configuration information comprises: a slot structure of each time unit;
notifying the configuration information to a second node; and
performing data transceiving between a first node and the second node according to the configuration information;
wherein configuring configuration information of each time unit within a transmission period comprises:
determining the transmission period;
configuring a transmission resource for uplink transmission within the transmission period, and configuring a transmission resource for downlink transmission within the transmission period; and
configuring the slot structure within the transmission period, wherein the slot structure comprises at least one of: an uplink slot structure or a downlink slot structure;
wherein configuring the slot structure within the transmission period and notifying the configuration information to a second node comprise one of:
semi-persistently configuring the slot structure of each time unit or a potential slot structure of each time unit, and indicating, through dynamic downlink control information, 'DCI', the slot structure of a time unit to be adjusted;
configuring a structure of a remaining flexible-resource part of each slot within the transmission period, and notifying the structure of the remaining flexible-resource through the DCI, wherein the structure of the remaining flexible-resource indicates at least the slot structure of the remaining resource part of each slot within the transmission period;
notifying, through a group common physical downlink control channel or a common physical downlink control channel, the slot structure of each time unit within the transmission period, and notifying, through UE-specific downlink control information, the second node of a time unit whose slot structure is changed;
notifying, in a license assisted access manner, the structures of a current time unit and one or more time units next to the current time unit, wherein the structures at least indicate the slot structures of respective time units;
determining and notifying, through semi-persistent configuration or predefinition, that a first symbol or first two symbols of each time unit is or are used for downlink transmission, and a last symbol or last two symbols of each time unit is or are used for uplink transmission; or
semi-persistently configuring a candidate time-unit structure, wherein the candidate time-unit structure indicates at least the slot structure of a time unit;
wherein the group common physical downlink control channel carries indication information for indicating a resource discarded for ultra reliable and low latency communication traffic.

2. The method of claim 1, wherein the transmission period is determined in one of the following manners: configuring the transmission period through operation administration and maintenance; configuring the transmission period through a radio resource control signaling; configuring the transmission period through a physical broadcast channel; notifying the transmission period through a system information block; configuring the transmission period by a media access control unit; or acquiring the transmission period in a random access process.

3. The method of claim 1, wherein configuring a transmission resource for uplink transmission within the transmission period comprises: configuring, through a system information block or high-layer signaling, a time unit used for the uplink transmission within the transmission period, a periodic sounding reference signal for transmission, a physical uplink control channel, and a physical random access channel.

4. The method of claim 1, wherein configuring a transmission resource for downlink transmission within the transmission period comprises: configuring a time unit fixedly used for the downlink transmission within the transmission period; a time unit for transmitting a synchronization signal block and transmitting a periodic channel state indication reference signal.

5. The method of claim 1, wherein the candidate time-unit structure configured semi-persistently is sent to a group of second nodes through the group common physical downlink control channel, and the group of second nodes is formed by second nodes capable of receiving the time-unit structure sent from a same group common physical downlink control channel in at least one of the following manners: being formed by classifying the second nodes according to geographical positions; being formed by classifying the second nodes according to beams being formed by classifying the second nodes according to sizes of traffic volumes; being formed by classifying the second nodes according to resources; or being formed by classifying the second nodes according to coverage areas.

6. The method of claim 5, wherein the group common physical downlink control channel through which the candidate time-unit structure configured semi-persistently is sent has predetermined group identity information, wherein the group identity information is acquired in an initial access process or configured through radio resource control signaling or a media access control unit.

7. The method of claim 1, wherein the configuration information comprises a slot structure with slot aggregation and flexible duplexing combined.

8. The method of claim 7, wherein the slot structure is determined by semi-persistently configuring length or class of the slot aggregation.

9. The method of claim 7, wherein the slot structure comprises one of the following:
each slot comprises uplink control information, downlink control information, and a group common physical downlink control channel, and a structure of each slot is the same;
only a first aggregated slot comprises the downlink control information, and only a last aggregated slot comprises the uplink control information; or
each slot comprises the uplink control information, the downlink control information, and the group common physical downlink control channel, and the structure of each slot is different.

10. The method of claim 7, wherein in response to determining that, in the slot structure, each slot comprises uplink control information, downlink control information, and a group common physical downlink control channel and the structure of each slot is the same, structures of a plurality of slots are configured semi-persistently, and aggregation classes of the plurality of slots are determined through the group common physical downlink control channel.

11. The method of claim 7, wherein in response to determining that, in the slot structure, only the first aggregated slot comprises the downlink control information and only the last aggregated slot comprises the uplink control information, an aggregation class and a resource position of the group common physical downlink control channel are configured in a manner of semi-persistent radio resource control signaling configuration.

12. The method of claim 7, wherein in response to determining that, in the slot structure, each slot comprises uplink control information, downlink control information, and the group common physical downlink control channel, the slot structure is configured by the first node semi-persistently through high-layer signaling, wherein the slot structure is configured in a bitmap indication manner through the group common physical downlink control channel, and the indication manner is used for indicating a structure of each slot among aggregated slots and indicating that the structure of each slot is different.

13. The method of claim 7, wherein configuration information about the slot aggregation is used for transmitting a transmission block or for retransmitting a code block group; or a part of the configuration information is used for transmitting ultra reliable and low latency communication traffic, and another part except the part of the configuration information is used for retransmitting the code block group.

14. The method of claim 1, wherein performing data transceiving between a first node and the second node according to the configuration information comprises:
   in response to determining that semi-persistent configuration scheduling and group hybrid automatic repeat request-acknowledgement feedback are fed back within timing time, if the slot structure of a slot is changed, data transmitted in an original structure is operated in one of following manners:
   being discarded;
   being transmitted in a spare resource in a next slot with the same slot structure if the next slot has the spare resource;
   if a frequency position at which the second node is scheduled in the slot is the same as the frequency position at which the second node is scheduled in a next slot with the same slot structure, performing multi-user multiplexing by the second node at the frequency position in the next slot with the same slot structure to transmit the data;
   re-indicating a new data transmission position;
   pre-configuring two time domain positions in initial scheduling, and sending the data in a first available time domain position; or
   for the second node scheduling a current slot, performing sensing on a frequency domain resource scheduled for a first orthogonal frequency division multiplexing symbol in a next slot with the same slot structure, and transmitting the data if the sensing is successful, while abandoning transmission or performing transmission in a modulation and coding scheme or power lower than a preset threshold if the sensing fails.

15. The method of claim 1, wherein performing data transceiving between a first node and the second node according to the configuration information comprises:

for dynamic time-division duplexing, when an uplink and downlink attribute of a slot where original acknowledgement/non-acknowledgement feedback is located changes so that the original acknowledgement/non-acknowledgement feedback fails to be transmitted, the original acknowledgement/non-acknowledgement is operated in one of the following manners:
being discarded;
being transmitted with acknowledgement/non-acknowledgement of a next slot in a manner of channel selection or multiplexing;
configuring and feeding back all acknowledgement/non-acknowledgement feedback according to a reference uplink and downlink slot structure;
successively delayed; or
giving a new slot position or symbol position for the acknowledgement/non-acknowledgement feedback in downlink control information.

16. The method of claim 1, wherein each time unit comprises one of:
   a sub-frame, a slot, a mini-slot, an orthogonal frequency division multiplexing symbol, or an aggregated slot.

17. A data transmission method, comprising:
   receiving configuration information configured by a first node, wherein the configuration information comprises a slot structure; and
   performing data transceiving between a second node and the first node according to the configuration information;
   performing data transceiving between a second node and the first node according to the configuration information comprises:
   when information configured semi-persistently and information configured dynamically conflict, determining, by the second node, the transmission direction and the transmission content according to latest received dynamic downlink control information signaling or configured priority of information to be transmitted;
   wherein determining, by the second node, the transmission direction and the transmission content according to the latest received dynamic downlink control information signaling or configured priority of the information to be transmitted comprises one of:
   transmitting, by a scheduled second node, data according to a latest scheduling signaling or slot format, and punching, according to signaling configured semi-persistently, at a transmission position of a reference signal in different direction to discard data in uplink transmission or downlink transmission at the punched position;
   indicating dynamic adjustment of a transmission position of an aperiodic reference signal, wherein for the scheduled second node, performing indication through UE-specific downlink control information, and for a non-scheduled second node, performing indication through a group common physical downlink control channel; for data transmission of a semi-persistent scheduled and grant-free second node, adopting downlink control information again to schedule a new resource, or indicating an ending of current transmission; and for a zero power-channel state information-reference signal, reserving transmission data;
   when unicast downlink control information indication of the second node is not received or transmission direction information is not indicated in the unicast downlink control information, determining the transmission direction and the transmission content according to the group common physical downlink control channel;

priority of a semi-persistently configured ensured fixed resource being higher than priority of a resource notified through downlink control information; or determining the transmission direction and the transmission content according to pre-configured information or specific downlink control information;

wherein the group common physical downlink control channel carries indication information for indicating a resource discarded for ultra reliable and low latency communication traffic.

* * * * *